(12) United States Patent
Marsal et al.

(10) Patent No.: US 8,496,452 B2
(45) Date of Patent: Jul. 30, 2013

(54) BEARING SPACER AND HOUSING

(75) Inventors: Damien Marsal, Morristown, NJ (US);
Jean-Pierre Lassalle, Morristown, NJ (US); Peter E. Mavrosakis, Morristown, NJ (US); Peter Davies, Granduillers (FR)

(73) Assignee: Honeywell International Inc., Morristown, NJ (US)

( * ) Notice: Subject to any disclaimer, the term of this patent is extended or adjusted under 35 U.S.C. 154(b) by 911 days.

(21) Appl. No.: 12/547,756

(22) Filed: Aug. 26, 2009

(65) Prior Publication Data

US 2011/0052429 A1    Mar. 3, 2011

(51) Int. Cl.
*F16C 23/06* (2006.01)
*F16C 41/00* (2006.01)

(52) U.S. Cl.
USPC .......................................... 417/406; 384/906

(58) Field of Classification Search
USPC .......................................... 417/406; 384/906
See application file for complete search history.

(56) References Cited

U.S. PATENT DOCUMENTS

| | | | |
|---|---|---|---|
| 4,601,590 A * | 7/1986 | Arii et al. .......................... | 384/99 |
| 4,721,441 A | 1/1988 | Miyashita et al. | |
| 4,943,170 A | 7/1990 | Aida | |
| 5,048,978 A | 9/1991 | Singh | |
| 5,067,825 A | 11/1991 | Vance et al. | |
| 6,626,574 B2 | 9/2003 | Bos et al. | |
| 2005/0286819 A1 * | 12/2005 | Mavrosakis ..................... | 384/99 |
| 2005/0287018 A1 | 12/2005 | Mavrosakis | |
| 2007/0003175 A1 * | 1/2007 | Petitjean et al. .............. | 384/322 |

FOREIGN PATENT DOCUMENTS

| | | |
|---|---|---|
| DE | 3601082 A1 | 7/1987 |
| EP | 0286883 A1 | 10/1988 |
| EP | 0440917 A1 | 8/1991 |
| EP | 1174629 | 1/2002 |
| EP | 1705393 A1 | 9/2006 |

OTHER PUBLICATIONS

European Patent Office European Search Report for EP Appl. No. 10172408.6-2321 / 2299066 of Feb. 3, 2012 (3 pages).
European Patent Office Communications for 3rd Party Observations as to EP Appl. No. 10172408.6-2321 / 2299066 of Nov. 18, 2011 and Oct. 31, 2011 (36 pages).

* cited by examiner

*Primary Examiner* — Charles Freay
*Assistant Examiner* — Philip Stimpert
(74) *Attorney, Agent, or Firm* — Brian Pangrle

(57) ABSTRACT

An exemplary center housing rotating assembly includes a turbine wheel (260); a compressor wheel (240); a center housing (210) that includes a through bore (215), extending from a compressor end to a turbine end along a bore axis, and a recess (217), adjacent the bore, in a plane orthogonal to the bore axis; a bearing assembly (230) positioned in the bore that includes a keyway (233); and an anti-rotation component (280) seated in the recess and at least partially in the keyway to restrict rotation of the bearing assembly in the bore. Various other exemplary devices, systems, methods, etc., are also disclosed.

13 Claims, 9 Drawing Sheets

BEARING SPACER AND HOUSING

TECHNICAL FIELD

Subject matter disclosed herein relates generally to turbomachinery for internal combustion engines and, in particular, to techniques for locating a bearing assembly in a bore of a turbocharger.

BACKGROUND

A conventional turbocharger typically relies on a center housing rotating assembly (CHRA) that includes a turbine wheel and a compressor wheel attached to a shaft rotatably supported by a bearing assembly located in a bore of a center housing. A typical bearing assembly or bearing cartridge includes an outer race and an inner race, configured to receive a shaft, where the outer race and the inner race are separated by rolling elements such as ball bearings.

In most CHRAs, a so-called "locating mechanism" restricts movement of a bearing assembly in the bore of the center housing. Various conventional locating mechanisms rely on radial insertion of a locating pin in an opening of an outer race of a bearing assembly. Such a mechanism restricts radial and/or axial movement of the bearing assembly and rotation of the outer race yet allows the inner race to spin freely. Additionally, such a mechanism allows for some radial movement of a bearing assembly, usually within defined clearances that fill with lubricant during operation to form a "squeeze film" that acts to damp vibration and noise. In such a CHRA, the degrees of radial and axial freedom may be chosen to be of particular magnitude or magnitudes depending on various goals.

Various issues can arise with locating mechanisms that rely on a radial locating pin to locate a bearing assembly. For example, during operation of a turbocharger, significant axial loads can be generated that thrust the turbocharger shaft and associated components toward the compressor end or toward the turbine end of the turbocharger CHRA, which, in turn, can be transferred from the bearing assembly to the radial locating pin. Such forces make pin strength an important design factor. Another issue pertains to axial stack-up of components (e.g., how well do the components of a CHRA stack and how does this stacking affect operation and wear). In general, a locating mechanism that relies on a radial locating pin does not provide advantages with respect to axial stacking; indeed, the nature of the pin and the outer race opening introduce geometric and operation concerns that can be disadvantageous.

More generally, a locating mechanism, such as the aforementioned radial pin locating mechanism, can be described in terms of "key/keyway pairs" that involve male (key) and female (keyway) components that act to locate an outer race of a bearing assembly. In such key/keyway-based locating mechanisms, frictional contact between key and keyway components should remain low (1) to allow a bearing assembly to move freely in the radial plane (i.e., within its squeeze film) and (2) to limit wear between the keyway components.

Additionally, in a CHRA, to maximize efficiency and reduce powerloss, frictional contact between components should be minimized. For turbochargers, the one source of powerloss stems from the bearing system. As described herein, various exemplary locating mechanisms can reduce or alleviate issues associated with locating mechanisms that rely on radial pins. For example, by reducing friction, such exemplary mechanisms can reduce powerloss and thereby improve efficiency and performance of turbocharged internal combustion engines.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein:

FIG. 3 also shows an example of a variation of the anti-rotation mechanism.

DETAILED DESCRIPTION

Figure 1:
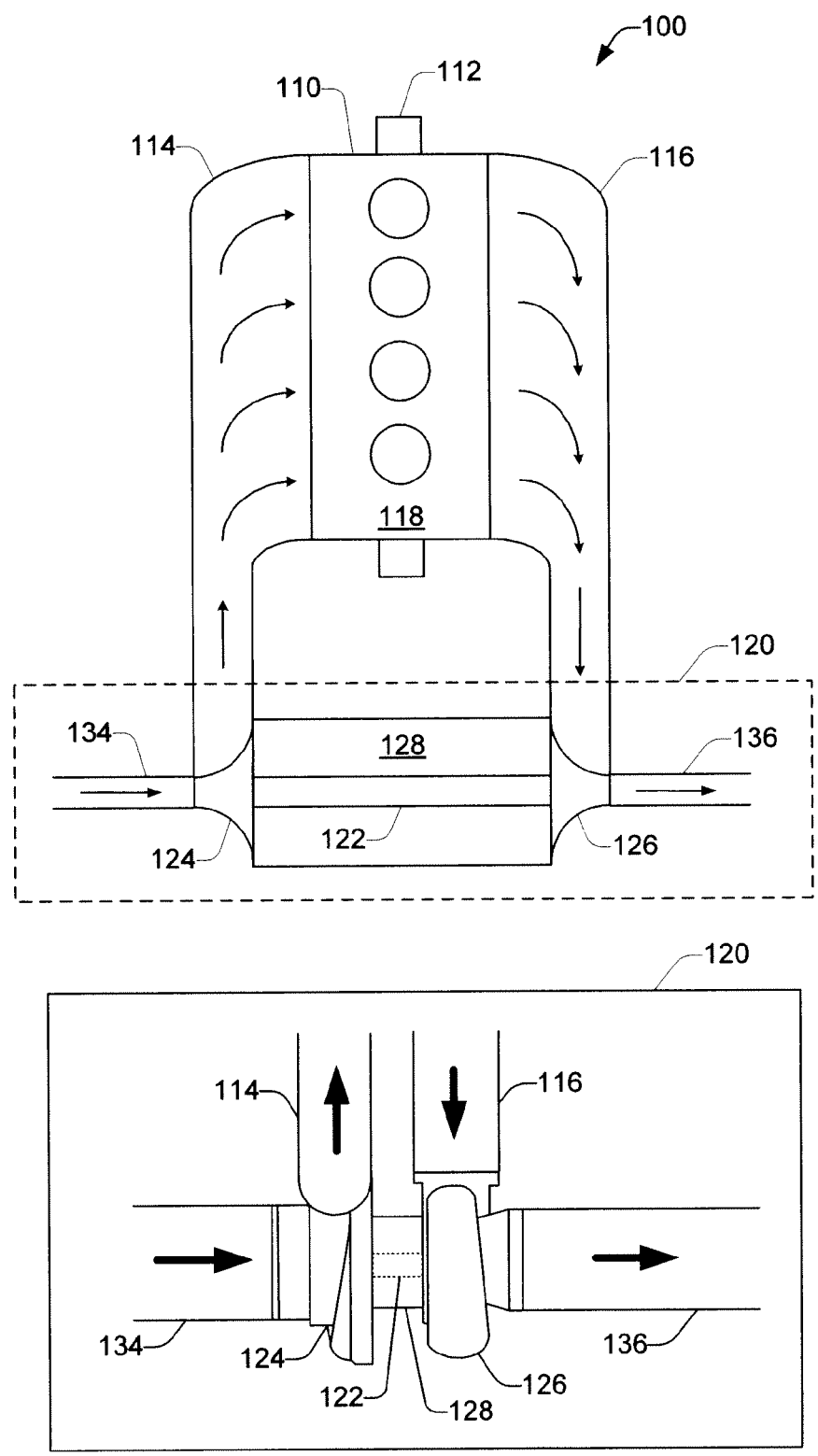
FIG. 1 is a diagram of a turbocharger and an internal combustion engine.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
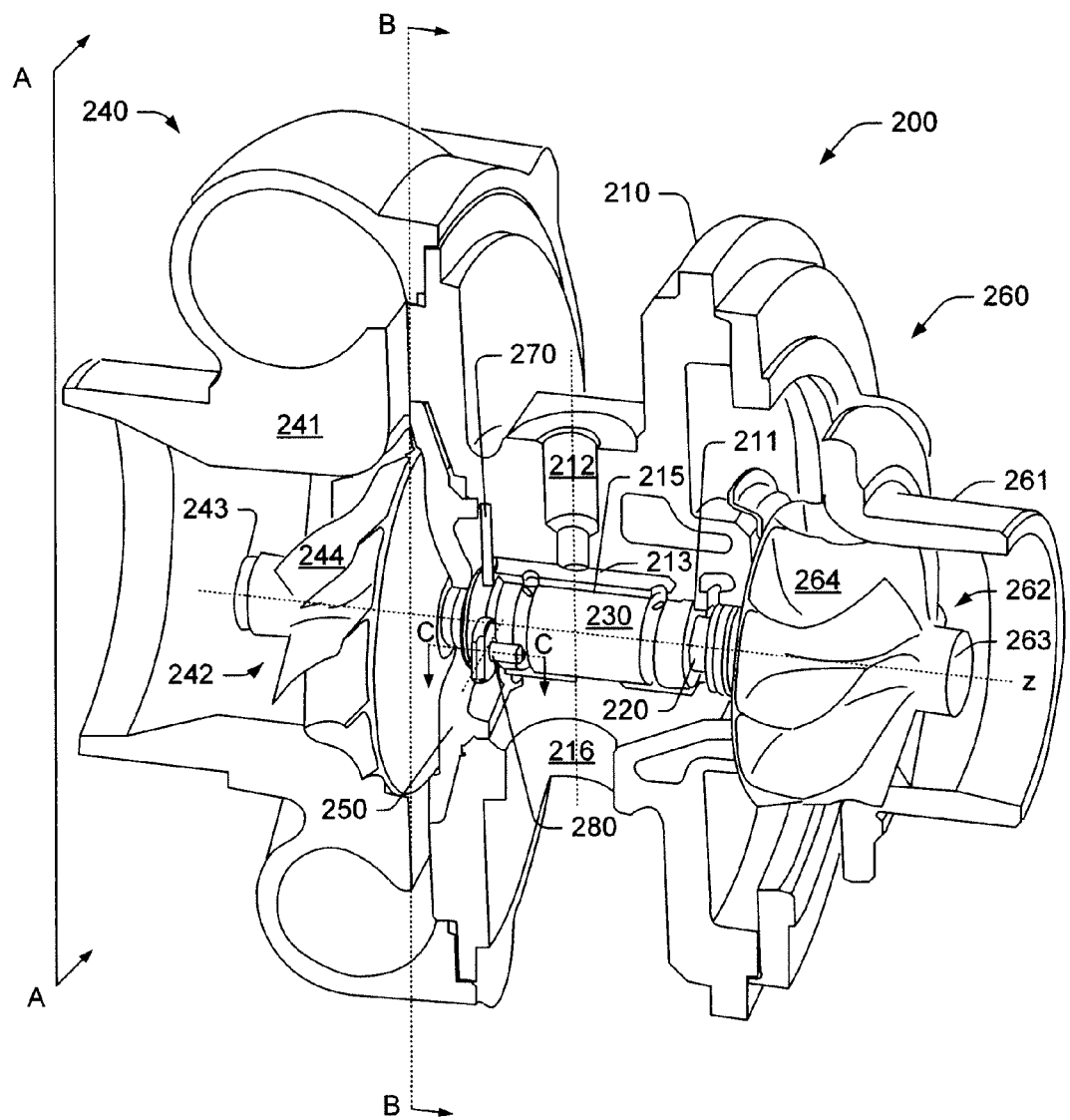
FIG. 2 is a cutaway perspective view of an exemplary turbocharger, along a plane defined by a line labeled A-A, which includes an anti-rotation mechanism for an outer race of a bearing assembly.
Figure 3:
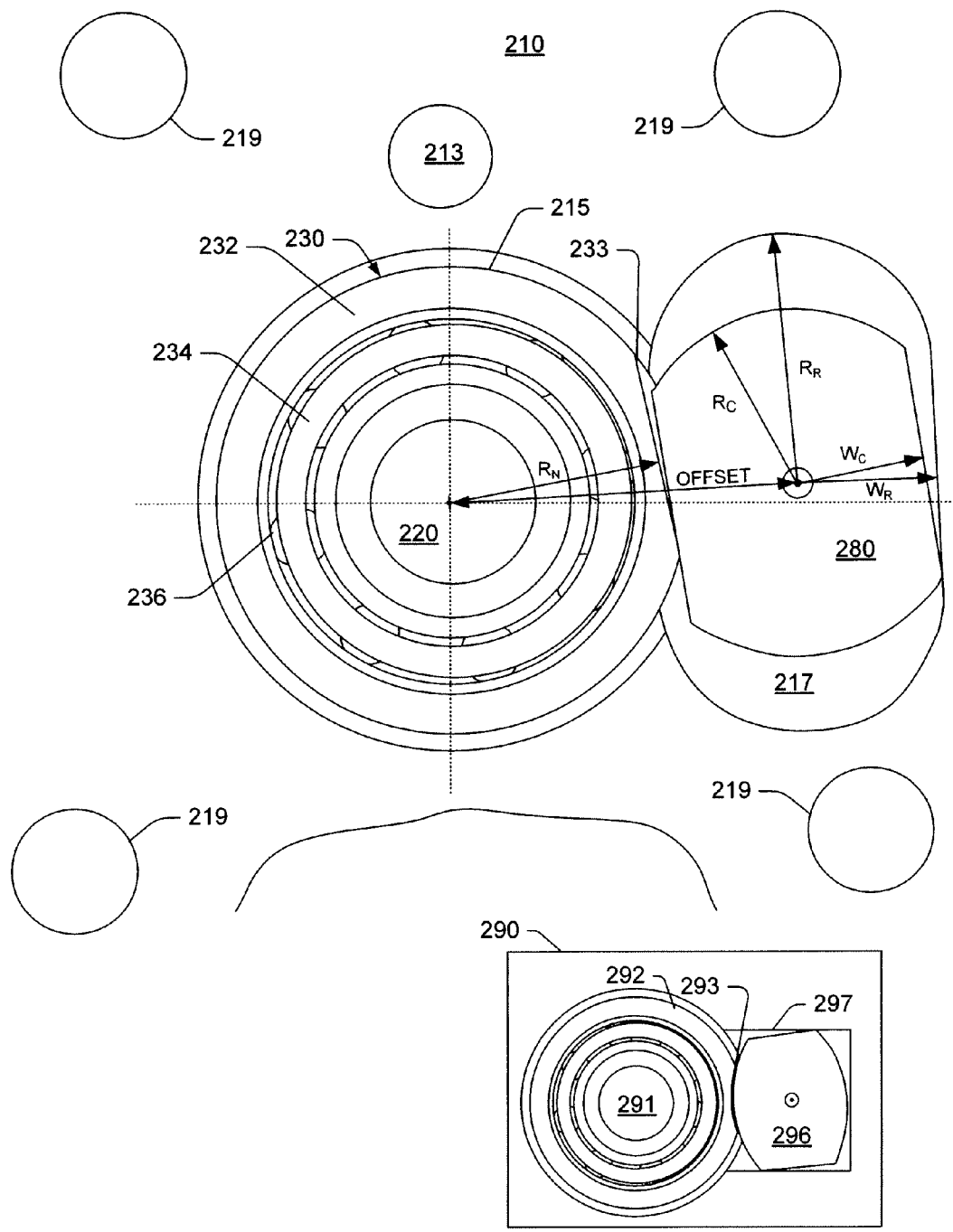
FIG. 3 is an end view of the turbocharger of FIG. 2 along a plane defined by a line labeled B-B, which includes the anti-rotation mechanism.
Figure 4:
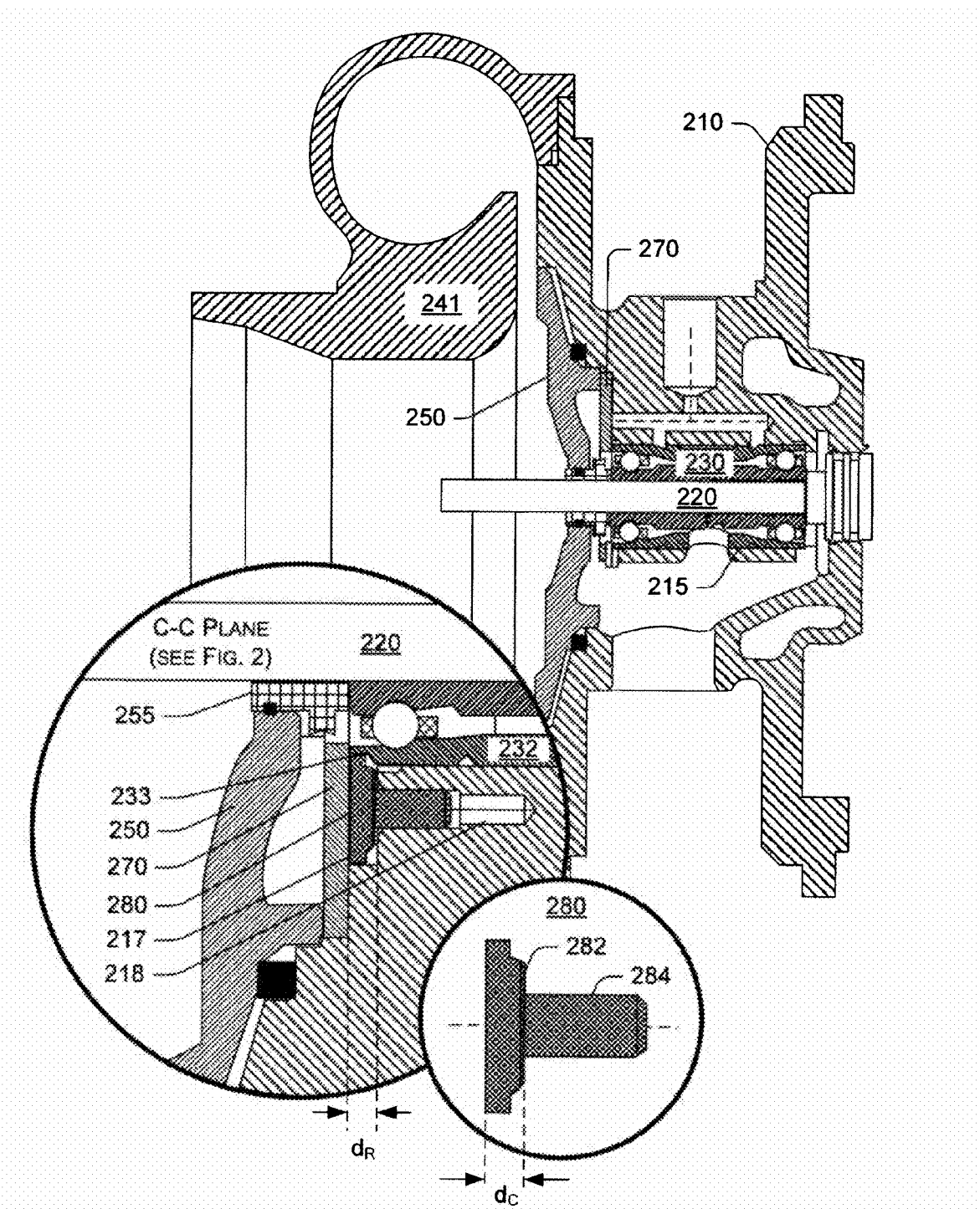
FIG. 4 is a cross-sectional view of the turbocharger of FIG. 2, along the plane defined by the line A-A, and an enlarged cross-sectional view, along a plane defined by a line labeled C-C in FIG. 2, which includes the anti-rotation mechanism.

FIG. 2 shows a cross-sectional perspective view of an exemplary turbocharger 200 where a plane defined by a line A-A, a plane defined by a line B-B and a plane defined by a line C-C are shown. The A-A plane is the cross-sectional plane of the view of FIG. 2 whereas a view for the B-B plane is shown in FIG. 3 and a view for the C-C is shown in FIG. 4.

The turbocharger 200 serves as a non-limiting example to describe various exemplary devices, methods, systems, etc., disclosed herein. The turbocharger 200 includes a center housing 210, a shaft 220, a bearing assembly 230, a compressor section 240, a turbine section 260 and a locating mechanism that includes a plate 270 and an anti-rotation component 280.

The compressor section 240 includes a compressor housing 241 that houses a compressor wheel 242 that includes a hub 243 and blades 244. The turbine section 260 includes a turbine housing 261 that houses a turbine wheel 262 that includes a hub 263 and blades 264. As shown, the compressor wheel 242 and the turbine wheel 262 are operably connected to the shaft 220. The shaft 220 may be made of multiple components that form a single operable shaft unit. The compressor wheel 240, the turbine wheel 260 and the shaft 220 have an axis of rotation substantially coincident with the z-axis. The center housing 210 includes a bore 215 that is configured to receive a bearing assembly 230, which, in turn, receives the shaft 220 and allows for rotation of the shaft 220 about the z-axis.

As shown in the example of FIG. 2, the center housing 210 includes lubricant pathways to allow lubricant to flow to and from the bearing assembly 230. Specifically, the housing 210 includes a lubricant inlet 212 and a lubricant outlet 216. Intermediate the lubricant inlet 212 and the lubricant outlet 216 are various features that define one or more lubricant flow paths. An axial lubricant path 213 is configured to direct lubricant from the lubricant inlet 212 to openings along the bore 215 of the center housing 210. As configured, lubricant can flow within the center housing 210 (e.g., enter the bearing assembly 230) and ultimately drain from the housing via the lubricant outlet 216 (e.g., due to gravity).

With respect to the locating mechanism, four components or features thereof are involved: (1) a stop 211 of the center housing 210, positioned at a turbine end of the bore 215; (2) the plate 270 attached to the center housing 210, positioned at a compressor end of the bore 213; (iii) a recess in the center housing 210 (see FIGS. 3 and 4); and (iv) the anti-rotation component 280, which may be positioned at any of a variety of locations along the length of an outer race of a bearing assembly. In the example of FIG. 2, the anti-rotation component 280 is shown as being positioned at the compressor end of the bore 215 and adjacent a compressor end of the bearing assembly 230 where at least a portion of the anti-rotation component 280 is seated in a recess of the center housing 210.

FIG. 3 shows a view of the turbocharger 200 from the B-B plane. Specifically, FIG. 3 shows the center housing 210, a recess 217 in the center housing 210, the shaft 220, the bearing assembly 230 and the anti-rotation component 280. The bearing assembly 230 includes an outer race 232, an inner race 234 and rolling elements 236. In the view of FIG. 3, the axial lubricant path 213 and the bore 215 are shown along with four apertures to receive bolts or the like to attach the plate 270 to the center housing 210.

In the example of FIG. 3, the outer race 232 includes a notched or keyway portion 233 that cooperates with a key portion of the anti-rotation component 280. As shown, the center housing 210 has a beveled edge at the compressor end of the bore 215 and the recess 217 is positioned adjacent the bore 215. The anti-rotation component 280 is seated in the recess 217, which is configured to limit rotation of the anti-rotation component 280. Specifically, the recess 217 and the anti-rotation component both have an oblong shape where that of the recess 217 is slightly larger in widthwise dimension than a corresponding dimension of the anti-rotation component 280, which while allowing for some movement, restricts excessive movement of the anti-rotation component 280 in the recess 217.

In the example of FIG. 3, the anti-rotation component 280 has an outer radius $R_C$ and a width $W_C$ while the recess 217 has an outer radius $R_R$ and a width $W_R$. As shown, these 2D dimensions of the recess 217 exceed those of the anti-rotation component 280. While FIG. 3 shows a particular configuration and shape, as described herein, other configurations and shapes may be used (see, e.g., the example 290). The example of FIG. 3 also shows an offset between an axis of rotation of the shaft 220 and an axis of rotation of the anti-rotation component 280. In this example, the anti-rotation component 280, as received by the recess 217, limits rotation of the outer race 232 about the axis of rotation of the shaft 220. The amount of rotation of the outer race 232 may be determined wholly or in part by one or more factors such as dimensions of the recess 217, dimensions of the anti-rotation component 280, dimensions of the keyway 233, etc.

In the example of FIG. 3, a point or points of contact exist between the keyway 233 and an edge of the anti-rotation component 280. Further, a point or points of contact exist between the anti-rotation component 280 and, for example, an axial wall of the center housing 210 that defines the recess 217. In the example of FIG. 3, contact between the anti-rotation component 280 and the center housing 210 counteract force exerted by contact between the outer race 232 and the anti-rotation component 280. Further, the anti-rotation component 280 as configured in FIG. 3, can restrict rotation of the outer race 232 in either clockwise or counter-clockwise directions. To do so, the anti-rotation component 280 can rotate (e.g., clockwise or counter-clockwise about an axis) as seated in the recess 217.

As a key with restricted movement, the anti-rotation component 280, when seated at least partially in the keyway portion 233 of the outer race 232, restricts rotational movement of the outer race 232. Hence, the aforementioned features restrict rotation of the bearing assembly 230 in the bore 215 of the center housing 210 without resorting to a radial locating pin. Further, as the anti-rotation component 280 is covered by the plate 270, axial thrust forces received by the anti-rotation component 280 (if any) can be transmitted to the plate 270. Specifically, depending on the relationship between the depth of the keyway 233, the recess 217 and the thickness of the anti-rotation component 280, it is possible to ensure that no significant axial thrust forces are transmitted to the anti-rotation component 280. In such a configuration, the anti-rotation component 280 has no or little detrimental effect as to axial stacking of the components of a CHRA.

FIG. 3 also shows an exemplary anti-rotation mechanism 290 where an anti-rotation component 296 (key) includes a curved edge (e.g., convex) and where a bearing 291 include an outer race 292 with a curved edge 293 (e.g., concave, defining a keyway). Further, the mechanism 290 includes a recess 297 having a shape (e.g. boundary) that acts to prevent or limit rotation of the anti-rotation component 296. In the examples of FIG. 3, the anti-rotation mechanisms may be referred to as including key/keyway pairs.

As described herein, an exemplary anti-rotation mechanism includes a feature associated with an outer race and another complimentary feature where the two features act as a key and keyway pair to limit rotation of the outer race.

FIG. 4 shows a cross-sectional view (along the A-A plane) of some of the components of the turbocharger 200 of FIG. 2 and an enlarged cross-sectional view of the anti-rotation component 280 in along the C-C plane as indicated in FIG. 2.

In the C-C plane view, the anti-rotation component 280 is shown as including a head portion 282 and a shaft portion 284. In the example of FIG. 4, the head portion 282 is seated in the recess 217 while the shaft portion 284 is seated in an axial bore 218. As described herein, the shaft portion 284 may loosely fit, tightly press fit, thread fit, etc., in the axial bore 218.

As shown in the C-C plane view, the plate 270 covers at least a part of the head portion 282 of the anti-rotation component 280. As mentioned, if axial thrust forces are received by the anti-rotation component 280, they may be transferred to the plate 270 (e.g., which may be referred to as a cover plate).

While not shown in the views of FIGS. 2, 3 and 4, the plate 270 can include apertures that allow for use of blots or the like to attach the plate 270 to the center housing 210. As shown in FIG. 4, another plate 250, referred to as a compressor wheel plate, is seated over the plate 270. In the example of FIG. 4, disposed between the compressor plate 250 and the locating plate 270 is a thrust collar 255. As shown, the thrust collar 250 can receive axial thrust forces from the shaft 220 (or inner race 234) and transfer these forces to the compressor plate 250. Thrust forces received by the outer race 232 can be transferred to the locating plate 270, which is attached to the center housing 210. Again, in various configurations, axial thrust received by the anti-rotation component 280 may be minimal or minimized.

As indicated in the C-C plane view of FIG. 4, the keyway feature 233 of the outer race 232 doe not interfere with the raceway of the inner surface of the outer race 232.

Figure 5:
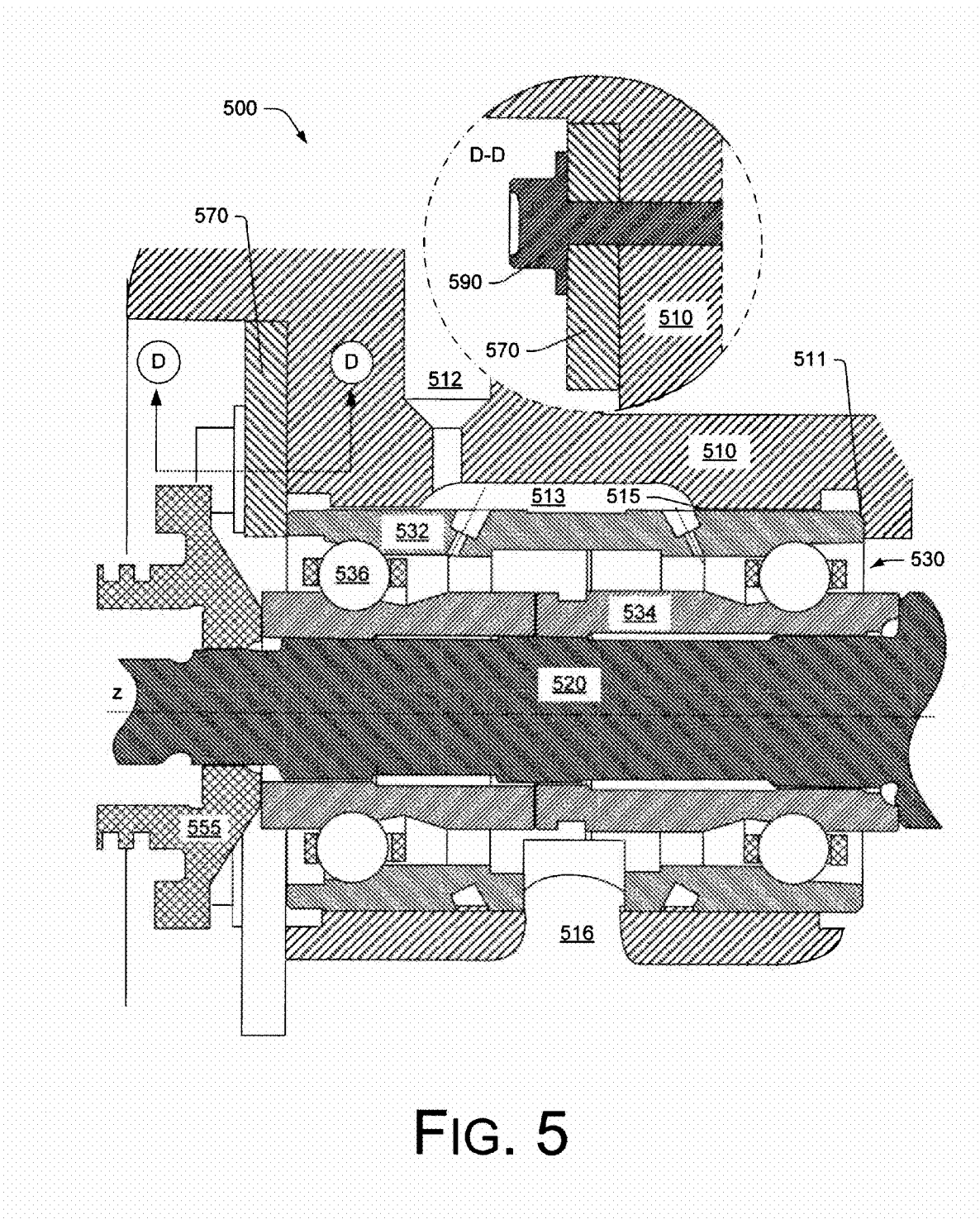
FIG. 5 is a cross-sectional view of a turbocharger and a cross-sectional view of a plate with integral key components of an anti-rotation mechanism, along a plane defined by a line labeled D-D.

As described herein, another exemplary anti-rotation mechanism relies on a plate that includes or seats one or more anti-rotation keys for receipt by one or more corresponding keyways (e.g., notches) in an outer race of a bearing assembly. FIG. 5 shows cross-sectional views of various components of an exemplary CHRA 500 including a center housing 510, a shaft 520, a bearing assembly 530, a thrust collar 555 and a plate 570. The center housing includes a stop 511 (e.g., an opening with an arc or a diameter smaller than the outer diameter of an outer race), a lubricant inlet 512, a lubricant well 513, a bore 515 and a lubricant outlet 516. The bearing assembly 530 includes an outer race 532, an inner race 534 and various rolling elements 536 disposed therebetween, which allows the inner race 534 to spin freely. As shown the inner race 534, which may be a multi-component inner race, receives a shaft 520 which attaches to a turbine wheel at a turbine end (right side) and a compressor wheel at a compressor end (left side).

In the example of FIG. 5, the stop 511 and the plate 570 act to axially locate the bearing assembly 530 in the bore 515 of the center housing 510. Specifically, the stop 511 restricts axial movement of the outer race 532 at the turbine end of the bore 515 while the plate 570 restricts axial movement of the outer race 532 at the compressor end of the bore 515. In the cross-sectional view along a plane defined by a line D-D, the plate 570 is shown as being attached to the center housing 510 via a bolt 590 that is inserted into the center housing 510 via an aperture 572 of the plate 570. The center housing 510 can include various openings with threads or other features to receive the bolt 590 or other attachment component (see, e.g., items 219 in the example of FIG. 3).

Figure 6:
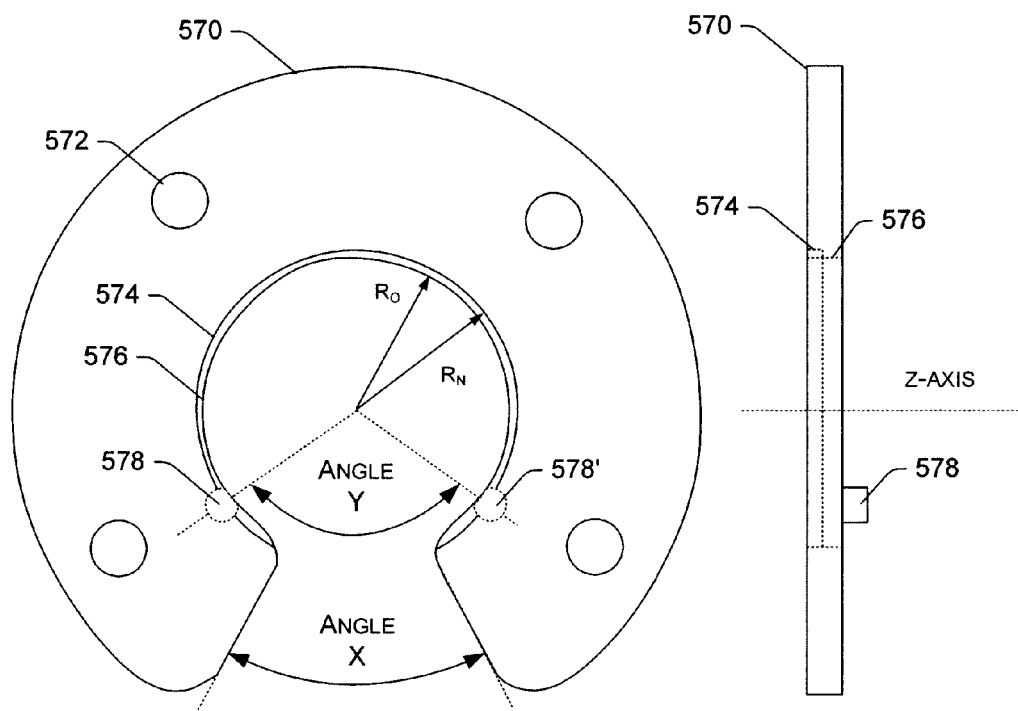
FIG. 6 is a plan view and a side view of the plate of FIG. 5.
Figure 7:
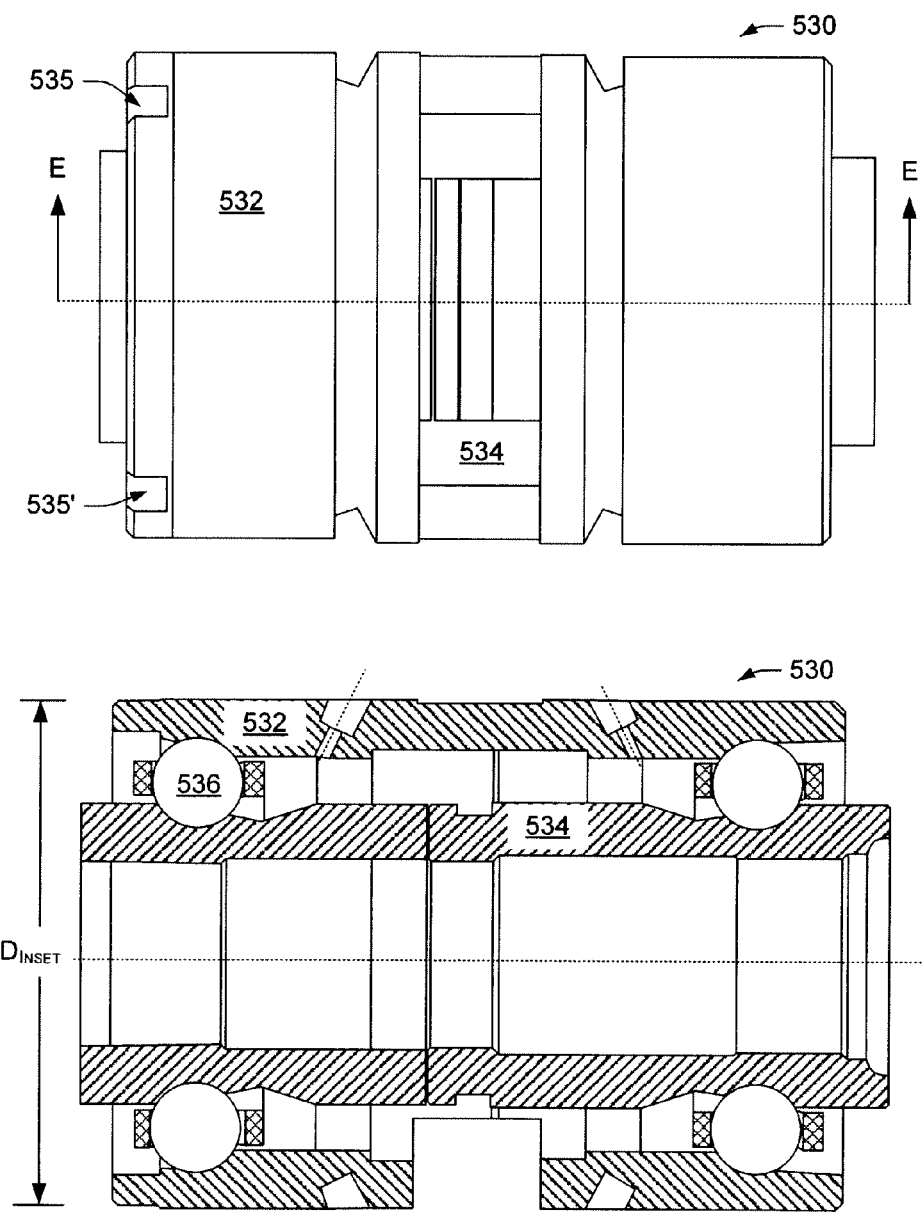
FIG. 7 is a plan view and a cross-sectional view of a bearing assembly of the turbocharger of FIG. 5, along a plane defined by a line labeled E-E in FIG. 7.
Figure 8:
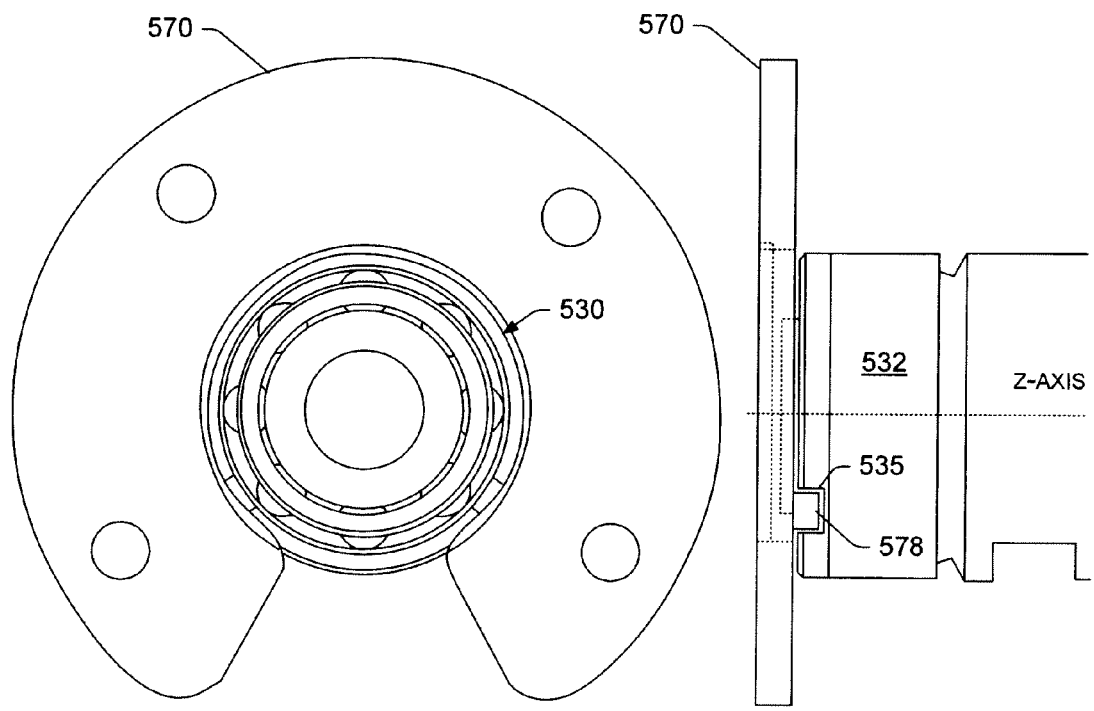
FIG. 8 is a plan view and a side view of the plate of FIG. 6 and the bearing assembly of FIG. 7.

Details of the anti-rotation mechanism associated with the plate 570 are shown in FIGS. 6, 7 and 8. Specifically, FIG. 6 shows features of the plate 570, FIG. 7 shows features of the bearing assembly 530 and FIG. 8 shows how features of the plate 570 and the bearing assembly 530 cooperate to restrict rotation of the outer race 532 of the bearing assembly 530.

FIG. 6 shows a plan view and a side view of the plate 570 of FIG. 5 along with a central z-axis for reference (see the z-axis of rotation of the shaft 520 in FIG. 5). In the example of FIG. 6, the plate 570 includes a cutout spanning angle X about the z-axis, a plurality of apertures 572, an arced notch 574 at a radius $R_N$, an opening at a radius $R_O$, and two keys 578, 578' positioned at an angle Y about the z-axis.

FIG. 7 shows a side view and a cross-sectional view of the exemplary bearing assembly 530 of FIG. 5. In the side view, keyways 535 and 535' are shown in the outer race 532. In the views of FIG. 7, the keyways 535, 535' are shown as being inset from an outer diameter of the outer race 532. Specifically, an inset diameter is labeled "$D_{Inset}$", which is less than an adjacent outer diameter. In the example of FIG. 7, the opposing end of the bearing assembly 530 does not include a section with an inset diameter. As shown in FIG. 5, the opposing end cooperates with the stop 511 of the center housing 510 to restrict axial movement of the bearing assembly 530.

FIG. 8 shows a plan view and a side view of the plate 570 and the bearing assembly 530. In FIG. 8, one of the keys 578, 578' of the plate 570 is shown as being received by a respective one of the keyways or notches 535, 535' of the bearing assembly 530. In such a manner, rotation of the outer race 532 of the bearing assembly 530 is restricted when positioned in the bore 515 of the center housing 510 as shown in FIG. 5.

In the examples of FIGS. 5, 6, 7 and 8, keys can be integral to a thrust plate while corresponding keyways can be integral to an outer race of a bearing assembly. As explained with respect to FIG. 7, the keyways can be recessed from the OD of the outer race such that the centerless grind of the bearing OD does not encounter any discontinuities along the OD, near the raceway. If there were discontinuities on the OD during the centerless grind operation, machining imperfections on the OD would be created and subsequently transferred to the raceway grind (which is registered off the OD).

As shown in FIG. 7, the keyways 535, 535' are located outboard of the raceway for the rolling elements 536. A key received by each of the keyway 535, 535' may be configured to avoid contact axially (e.g., at an axial wall of a keyway). In such an example, a key only contacts a lateral wall or walls of a keyway (e.g., in the azimuthal direction). As described herein, a keyway may be undercut on the outer diameter of an outer race of a bearing assembly and formed in a manner that avoids interference with a raceway (e.g., as bound by a low shoulder (face side) and a high or "deep" shoulder (back side)). For example, a "ball band" may be formed by a ball riding over an edge of a raceway (e.g., which may be possibly caused by thrust forces). Hence, in various examples, one or more keyways in an outer race are formed using a centerless grind operation where the one or more keyways are positioned to avoid risk of raceway/rolling element damage (e.g., via thrust, misalignment, loose fit, etc.). As described herein, a keyway may be an OD relief of an outer race (e.g., for friendliness to a centerless grind operation).

Figure 9:
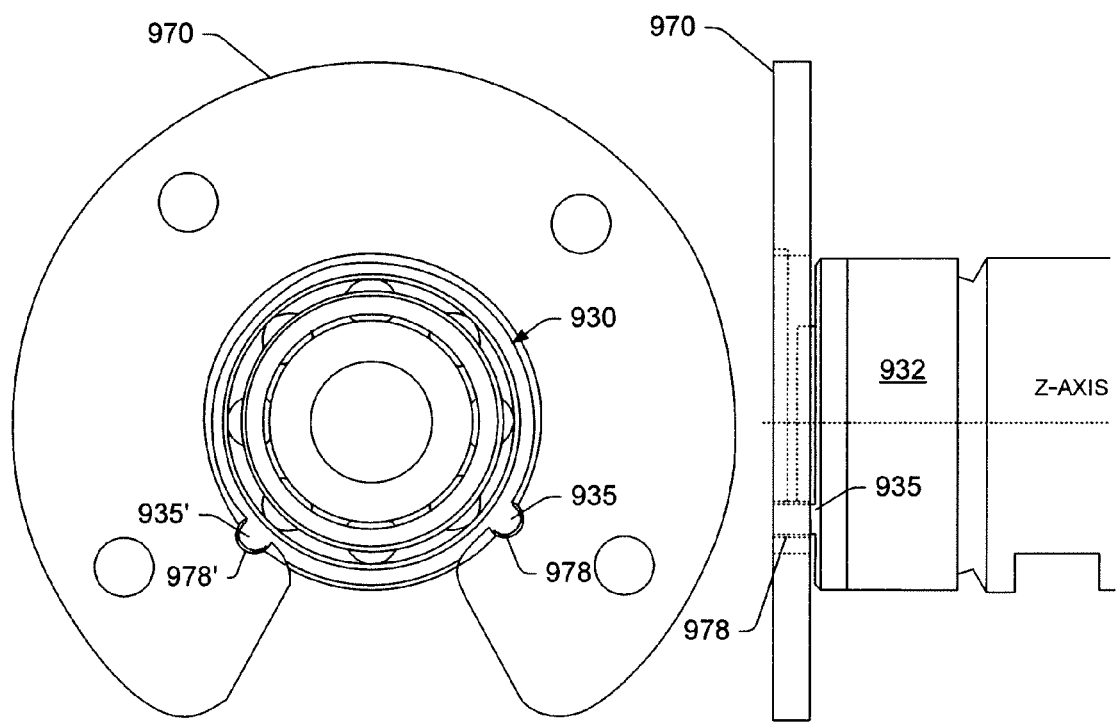
FIG. 9 is a plan view and a side view of a plate and the bearing assembly where the plate includes a keyway and the bearing assembly includes a key.

FIG. 9 shows a plan view and a side view of a plate 970 and a bearing assembly 930. In FIG. 9, the plate 970 includes keyways 978, 978' and an outer race 932 of the bearing assembly 930 includes keys 935, 935'. The keys 935, 935' of the outer race 932 are shown as being received by the respective keyways 978, 978' of the plate 970. In such a manner, rotation of the outer race 932 of the bearing assembly 930 is restricted when positioned in a bore of a center housing.

In various examples, a plate may include one or more keys and one or more keyways. In various examples, an outer race of a bearing may include one or more keys and one or more keyways. In such examples, a key is received by a keyway. Various examples exist where depending on number of keys and keyways, some keyways may be unfilled upon assembly. For example, consider an outer race with four keyways and a plate with two keys where two of the keyways remain unfilled upon assembly. In various examples, a key/keyway pair (or pairs) provides a proscribed amount of freedom for a bearing assembly to move radially in a squeeze film damper (e.g., as formed between the outer race and bore of a housing).

As described herein, features of an outer race of a bearing assembly may act to locate the outer race with respect to one or more features of a housing. For example, the bearing assembly 530 of FIG. 5 includes lubricant jets to direct lubricant from the lubricant well 513 to the rolling elements 536. In such an example, one or more key/keyway pairs may act to locate the lubricant jets with respect to the lubricant well 513. In general, such locating may be referred to as azimuthal locating that establishes a relationship between an asymmetrical outer race and a housing (e.g., in an azimuthal direction, defined by a longitudinal axis of a bore of the housing).

As described, the exemplary locating mechanism of FIGS. 5, 6, 7, 8 and 9 allows for efficient machining of keys and keyways that act to limit rotational freedom of an outer race while maintaining low friction enabling radial freedom within its lubricant film and beneficial wear properties between key/keyway pairs.

As described herein, an exemplary method for locating an outer race of a bearing in a bore of a housing includes inserting the bearing in the bore of the housing; attaching a plate to the housing to at least partially axially locate the bearing in the bore of the housing; and restricting rotation of the outer race of the bearing in the bore of the housing by contacting an axially extending key and a keyway. In such a method, the plate may include the key and the bearing may include the keyway or, alternatively, the outer race of the bearing may include the key and the plate may include the keyway. In such a method, the contacting optionally azimuthally locates one or more lubricant jets of the outer race of the bearing with respect to a lubricant well of the housing. In such a method, the plate may receive axial thrust forces without an axial end of the key contacting an axial end of the keyway (e.g., to avoid wear on the key and/or keyway).

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:
1. A center housing rotating assembly comprising:
a turbine wheel (260);
a compressor wheel (240);
a center housing (210) that comprises
a through bore (215), extending from a compressor end to a turbine end along a bore axis, and
a recess (217, 297), adjacent the bore, in a plane orthogonal to the bore axis;
a bearing assembly (230, 291) positioned in the bore that comprises an inner race (234), rolling elements (236), and an outer race (232, 292) with a keyway (233, 293); and
an anti-rotation component (280, 296) seated in the recess (217, 297) and at least partially in the keyway (233, 293) to restrict rotation of the outer race (232, 292) of the bearing assembly (230, 291) in the through bore (215), wherein the anti-rotation component (280, 296) comprises dimensions in the plane orthogonal to the bore axis, wherein the recess (217, 297) comprises dimensions in the plane orthogonal to the bore axis that exceed the dimensions of the anti-rotation component (280, 296) to determine an amount of rotation of the outer race (232, 292) in the through bore (215) by points of contact that restrict rotation of the outer race (232, 292) for clockwise rotation of the anti-rotation component (280, 296) and by other points of contact that restrict rotation of the outer race (232, 292) for counter-clockwise rotation of the anti-rotation component (280, 296), and wherein the anti-rotation component does not receive axial thrust forces from an axial face of the outer race.

2. The center housing rotating assembly of claim 1 further comprising a cover plate (270) attached to the center housing wherein the cover plate covers at least part of the anti-rotation component.

3. The center housing rotating assembly of claim 1 wherein the anti-rotation component comprises a head portion (282) and a shaft portion (284).

4. The center housing rotating assembly of claim 3 wherein the center housing comprises an axial bore (218) configured to receive the shaft portion of the anti-rotation component.

5. The center housing rotating assembly of claim 1 wherein the anti-rotation component, as seated in the recess, is configured to rotate counter-clockwise responsive to clockwise rotation of the outer race (232, 292) of the bearing assembly and to rotate clockwise responsive to counter-clockwise rotation of the outer race (232, 292) of the bearing assembly.

6. The center housing rotating assembly of claim 1 wherein the anti-rotation component comprises an axis of rotation offset from the bore axis.

7. The center housing rotating assembly of claim 1 wherein the recess is positioned at a compressor end of the center housing.

8. The center housing rotating assembly of claim 7 wherein the recess comprises a depth sufficient to seat the anti-rotation component below a compressor end surface of the center housing.

9. The center housing rotating assembly of claim 1 wherein an axial dimension of the recess exceeds an axial dimension of a portion of the anti-rotation component.

10. The center housing rotating assembly of claim 1 wherein the recess comprises a two-dimensional oblong shape in the plane orthogonal to the bore axis.

11. The center housing rotating assembly of claim 1 wherein the anti-rotation component comprises a two-dimensional oblong shape in the plane orthogonal to the bore axis.

12. The center housing rotating assembly of claim 1 wherein the points of contact that restrict rotation of the outer race (232) for clockwise rotation of the anti-rotation component (280) comprise a point of contact between the anti-rotation component (280) and a side wall of the recess (217) and wherein the other points of contact that restrict rotation of the outer race (232) for counter-clockwise rotation of the anti-rotation component (280) comprise a point of contact between the anti-rotation component (280) and the side wall of the recess (217).

13. The center housing rotating assembly of claim 1 wherein the points of contact that restrict rotation of the outer race (292) for clockwise rotation of the anti-rotation component (296) comprise a point of contact between the anti-rotation component (296) and a side wall of the recess (297) and wherein the other points of contact that restrict rotation of the outer race (292) for counter-clockwise rotation of the anti-rotation component (296) comprise a point of contact between the anti-rotation component (296) and another side wall of the recess (297).

* * * * *